United States Patent
Reaume et al.

(10) Patent No.: US 7,398,423 B2
(45) Date of Patent: Jul. 8, 2008

(54) SYSTEM AND METHOD FOR PROVIDING AUTOMATIC RESETS

(75) Inventors: Daniel J. Reaume, Livonia, MI (US); Guoxian Xiao, Troy, MI (US); Qing Chang, Troy, MI (US); Pulak Bandyopadhyay, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 544 days.

(21) Appl. No.: 11/007,872

(22) Filed: Dec. 9, 2004

(65) Prior Publication Data

US 2006/0143545 A1    Jun. 29, 2006

(51) Int. Cl.
*G06F 11/00* (2006.01)

(52) U.S. Cl. .......................................... 714/23; 714/37

(58) Field of Classification Search ........................ None
See application file for complete search history.

(56) References Cited

U.S. PATENT DOCUMENTS

| | | | | |
|---|---|---|---|---|
| 5,327,349 A | * | 7/1994 | Hoste | 700/110 |
| 5,491,631 A | * | 2/1996 | Shirane et al. | 701/35 |
| 5,696,676 A | * | 12/1997 | Takaba | 701/31 |
| 6,442,460 B1 | * | 8/2002 | Larson et al. | 701/33 |
| 6,529,954 B1 | * | 3/2003 | Cookmeyer et al. | 709/224 |
| 6,615,367 B1 | * | 9/2003 | Unkle et al. | 714/26 |
| 6,795,935 B1 | * | 9/2004 | Unkle et al. | 714/37 |
| 6,816,813 B2 | * | 11/2004 | Tan et al. | 702/181 |
| 6,925,368 B2 | * | 8/2005 | Funkhouser et al. | 701/33 |
| 7,092,937 B2 | * | 8/2006 | Morgan et al. | 707/3 |
| 7,100,084 B2 | * | 8/2006 | Unkle et al. | 714/26 |
| 7,216,258 B2 | * | 5/2007 | Ebsen et al. | 714/33 |
| 7,281,163 B2 | * | 10/2007 | Brown et al. | 714/31 |
| 2002/0052718 A1 | * | 5/2002 | Little et al. | 702/188 |
| 2005/0075748 A1 | * | 4/2005 | Gartland et al. | 700/108 |

* cited by examiner

*Primary Examiner*—Christopher S McCarthy

(57) ABSTRACT

A method for determining whether to provide automatic reset instructions to a machine with reset capability with respect to a fault code event, the method comprising, in a database, collecting records comprising the identification of the machine, a fault code associated therewith and the duration of a fault associated with the fault code that the machine experienced within a time period, and performing a statistical analysis on the records to analyze whether executing an automatic reset on the machine with respect to the fault code will probabilistically rectify the fault and to generate resultant data.

18 Claims, 2 Drawing Sheets

SYSTEM AND METHOD FOR PROVIDING AUTOMATIC RESETS

TECHNICAL FIELD

Described herein is a system, method and apparatus for identifying production line machine downtime events that may be remedied by automatic resets. More particularly, downtime events are analyzed so that in certain situations where a machine experiences downtime, that machine may be restarted with an automatic reset.

BACKGROUND OF THE INVENTION

In large assembly or manufacturing plants, as many as five thousand machines may be grouped into one hundred and fifty stations. Many plants are substantially automated, where one manufacturing staff person may operate as many as eight to ten machines. Additionally, a large plant may have approximately twenty maintenance staff per shift.

For many different reasons, a machine may cease functioning. Most often, the machine has a small malfunction, requiring only a press of its reset button to resume operation. There may be many reasons for the small malfunction. In fact, even though a reset most often may return a machine to its functioning status, there are as many as one thousand fault codes associated per machine. A fault code is an industry term to categorize the cause of a problem with a machine. Much like in a modern automobile, sensors are disposed in a machine to detect when out of the ordinary situations occur. In the case of an automobile, for example, if a door is left ajar, a fault code will be generated to alert the occupant that a door is ajar. Fault codes, when generated, may be electronically sent to a central location when a machine stops operating.

In a large plant, when one machine fails, its entire station may stop operating. As a result, parts to be processed by the machine or station may accumulate, with machines feeding the halted machine becoming blocked because the upstream buffer has filled. Moreover, parts discharged for further processing by a downstream machine may drain from the downstream buffer, with machines drawing from it becoming starved. The impact of a downed machine or station can quickly spread to other machines and stations of the production line.

When a machine stops functioning, a light atop the machine will flash red and project sound signals. Furthermore, a maintenance staff member may have an indication of a stopped machine via a notice sent to the maintenance staff member's PDA. The maintenance staff member must then go, typically on foot, to the stopped machine to manually press a reset button on the machine. Most of the time, manually pressing the reset machine cause the machine to restart without incident Once the halted machine is recognized, stoppage is usually rectified in less than three to four minutes.

The time it takes for the maintenance staff member to manually reset the machine isn't typically substantial. However, in a typical sixteen hour day in a plant of the size previously described, there are typically one thousand fault codes generated.

Situations that can be fixed by pressing the reset button include, but are not limited to that a part arrives one-tenth of a second too late to its position within the machine; that the machine's clamping mechanism did not completely clamp the part; a switch temporarily failing to detect the presence of a part; a part of being temporarily jammed, a safety stop being triggered by breaking a light beam or pressing a palm button.

The maintenance staff is better utilized carrying out its primary task of maintaining the machines with preventative maintenance. Currently, a skilled tradesperson is required to perform such manual resets because their expertise is required to evaluate the situation. Maintenance staff's primary task also includes significant equipment failures.

SUMMARY OF THE INVENTION

Disclosed herein are a system, method and apparatus for identifying downtime events that may be remedied by automatic resets with pre-determined and minimal risk of damage. Each downtime event is recorded in a database, and is characterized by the identity of the equipment undergoing the downtime event and the fault code corresponding to the downtime event. The database also records the duration of the downtime. Based on the downtime duration or, if available, the rectification code for the downtime event, each event is classified as to whether a reset rectified the equipment problem; this classification may also be included in the database record for that event.

The database therefore contains a sample of events, and by application of one or more statistical methods, the probability that a given event (for a particular fault code and particular piece of equipment) can be rectified by a reset with a specified probability and with a specified confidence level can be evaluated. This provides a determination of whether, without exceeding a predetermined level of risk, the particular piece of equipment, when entering downtime with the particular machine fault code, could be remedied by an automatic reset.

BRIEF DESCRIPTION OF THE DRAWINGS

Referring to the exemplary drawings wherein like elements are numbered alike in the several FIGURES.

DETAILED DESCRIPTION

Figure 1:
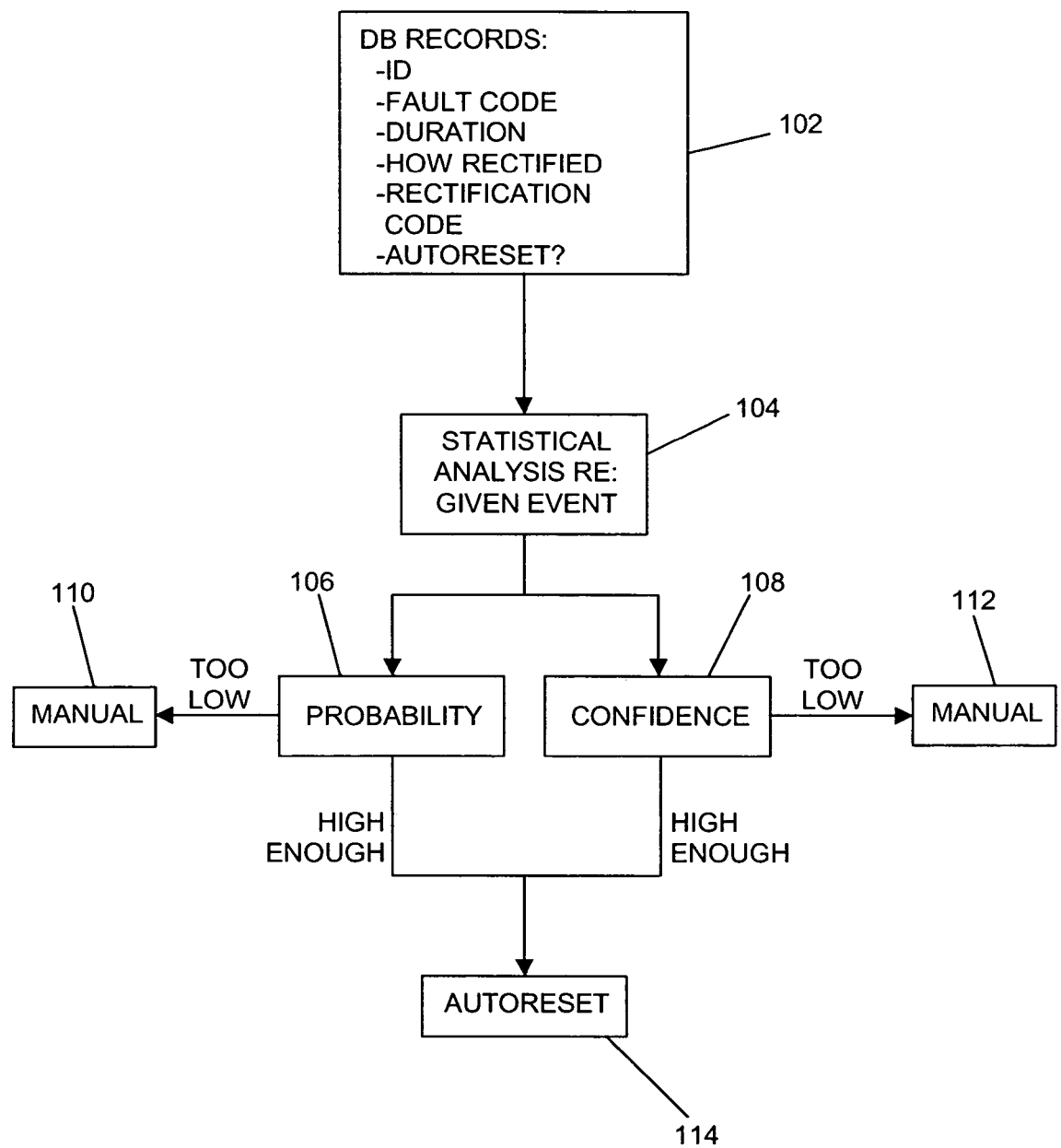
FIG. 1 is a flow chart of one embodiment of the system and method described herein.

Disclosed herein is a method and system, to make a determination as to which machine stoppages and their associated fault codes likely could be rectified by an automatic reset while mitigating risk that an automatic reset could result in damage, for example, to the machine or the part. Moreover, a method, system and apparatus are disclosed for operating a plant or other coordinated set of machines with operable reset functions. The term "fault code" denotes a data item generated under certain circumstances by a sensor on a machine or station. The term is not intended to mean that there are any defects with the machine or the parts being manufactured or assembled therewith. The term fault code is an industry term that can be used interchangeably with, for example, error code.

While the present disclosure discusses embodiments with reference to production plants having machines with reset capability, other uses are contemplated. The term "machine with reset capability," as used above and herein, may include any machine or apparatus that may perform a function, operation, or transformation on input, to produce a useful result. Here input may be a material workpiece, a material substance, data in electronic or optical form, or energy or motive power. This definition is intended to comprise: electrical transformers, switches, and other elements of utility grids; oil and gas pipeline valves and switches; server farms for data processing in client-server applications; mass storage device farms (e.g., magnetic, optical, magneto-optical or other electronic form of mass storage for electronic data); telephone switch devices and other data communication switch devices, including but not limited to routers and WAN switch devices; workstations and other data processing devices; and any and all systems and apparatuses to which this technology may be applied in its broadest sense.

Embodiments of the invention may take the form of any number of computer-implemented processes and apparatuses for practicing those processes. Embodiments of the invention may be in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing an embodiment of the invention. Embodiments may also take the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing an embodiment of the invention. When implemented on a general-purpose microprocessor, the computer program code segments configure the microprocessor to create specific logic circuits.

FIG. 1 illustrates a database 102 wherein data is collected for analysis. For downtime events, the identification of the machine is captured; the fault code associated with the downtime; the duration of the downtime; how the downtime was rectified; its classification, that is whether the stalled machine was fixed by pressing its reset button; and whether an automatic reset was engaged. There may be as many as 1000 fault codes associated with a given machine. They include but are not limited to dislocation of the part, pump leaking, part needs to be reclamped and pressure too low.

A statistical analysis of the data is then performed by a computer processor 104. Such analysis includes a step to specify a threshold probability p and a desired confidence w that a given fault code for a given piece of equipment is rectified by a reset. The steps comprise collecting downtime data on downtime events, including equipment name, duration, fault code, and (if available), what was done to rectify the problem. For the downtime event, classify whether or not it was (likely) rectified by a reset by a) considering any suitably short downtime to be the result of a reset or b) based on the rectification code. For a fault code for a piece of equipment, statistically test the hypothesis that the probability that a given downtime event is rectified by a reset is greater than p.

In one embodiment, the result of each collected downtime event is either to reset or not reset. Each downtime event is then a Bernoulli trial, so that the total number of resets in response to a given fault code for a given piece of equipment is a binomially distributed random variable. In another embodiment, the statistical analysis considers the hypothesis that a reset fixes the problem (for a given fault code and machine) with probability p or greater. If the hypothesis cannot be rejected at the confidence level w, then the given fault code for the given equipment should be handled via an automatic reset.

The probability that a reset fixes a fault is determined by counting the data values. The confidence, on the other hand, relates to the observed probability as well as the number of data points collected. For example, a Gallup poll may find that candidate x has 42% of the vote +/−2% with 95% confidence. In this case, the observed probability that given person votes for the candidate is 42%, and we are 95% confident that the probability is no less than 40%.

The decision making process performed by the processor 104, therefore, provides the probability 106 (either high enough or too low) that an automatic reset will resolve the stalled machine and the confidence level 108 (either high enough or too low) that an automatic reset will resolve the stalled machine. When the probability 106 is tested and it is too low that an automatic reset will resolve the stalled machine, a manual reset at 110 is recommended for that fault code and that machine. When the confidence level 108 is tested and it is too low that an automatic reset will resolve the stalled machine, a manual reset at 112 is recommended for that fault code and that machine.

The confidence level is set on a machine-by-machine basis, and not measured. It could be considered an input to the algorithm, not a result (although there could be a second algorithm used to produce an appropriate confidence level to use for each machine).

For some machines and some fault codes, a confidence level of substantially 100% may avoid undesirable results. When the relevant statistical analysis is carried out with that specified confidence level, it is referred to herein as substantially analyzing the fault for certainty. As mentioned above, hypothesis testing on frequency is one embodiment. Another embodiment includes an analysis of the total number of consecutive resets greater than a certain amount. Also contemplated are statistical and probability analyses provided by methods. Another embodiment is to approximate the binomial distribution (according to which the number of resets is distributed) with a normal distribution and test the hypothesis that a normally distributed random variable has value that exceeds a threshold. Another embodiment is to look at a series of fault events and apply pattern analysis techniques to predict whether a given fault is likely to be remediable via a reset with at least a certain confidence. For example, if one were to see seven consecutive faults that are remedied via rests, then there is a high probability that the next fault will also be remedied via a reset. Another embodiment is pattern recognition analysis that examines a sequence of downtime events for repeated patterns of fault remediations. Yet another embodiment includes treating a number of automatic resets in a sequence of downtime events as normally distributed random variables.

Confidence and certainty are often used interchangeably, although sometimes certainty refers to 100% or near 100% confidence. Risk is the exposure to downside potential due to uncertainty. For example, if you buy a product with a money-back guarantee, there is no risk, even if there is uncertainty about whether or not the product works.

Additionally, fault data may be weighted, such as exponential smoothing to give more emphasis to more recent results. This may be important in situations where the system changes dynamically, such as through part replacements, maintenance actions, where the older data is less relevant.

Figure 2:
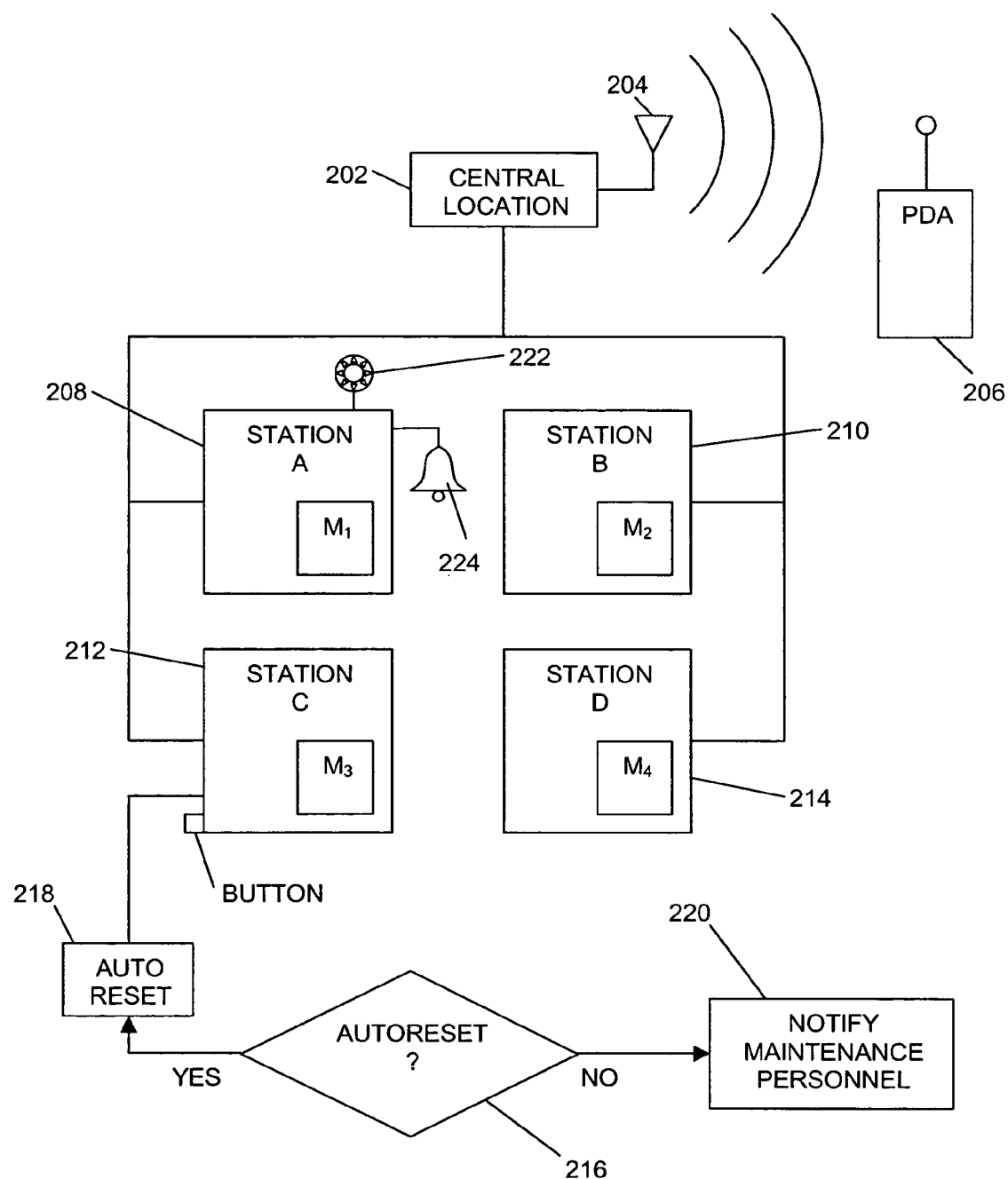
FIG. 2 represents an apparatus and system for operating a plant using the system and method described herein.

FIG. 2 is a system employing the method and process described herein. The central location 202 includes a database with the results provided by the system and method of FIG. 1. The fault codes with respect to the probability, certainty and risk for using an automatic reset on a particular machine are stored therein. As mentioned, in other embodiments, further analysis of fault codes with respect to automatic resets may be employed. The central location 202 further includes a communication module 204 capable of sending messages to the maintenance personnel regarding the status of stalled machines and their fault codes. The maintenance personnel may receive such information via a communication device such as a PDA 206.

Stations A, B, C and D, respectively 208, 210, 212 and 214 are in communication with the central location or one or more different locations depending on computer capacity, convenience, or other considerations. In the event that Station A, including a plurality of machines, experiences a stalled machine, a signal is sent to the central location so that an automatic reset command may be issued or not issued. In the alternative, each station or machine may be equipped with a database to compare fault codes with fault events.

To obtain data, fault information may be pooled across machines. The more data, the higher certainty. For example, a very rare fault may occur only once per year on a given robot. But a plant may have 400 such robots, substantially identical. It may be possible to aggregate the data for all 400 robots in such a situation.

As shown in FIG. 2, a query as whether to command an automatic reset for a stalled machine is made 216. The query can take place by a processor at the central location, at the station or at the individual machine. The fault code is compared with fault events as per the analysis as described in detail above, and either the auto reset is effected 218 or it is not 220. When the automatic reset has not taken place, the maintenance personnel may be notified via PDA 206, a light 222 atop the machine, or a sound alarm 224 which may include a song or a buzzer.

In one embodiment, a review of the success of the original analysis is provided and the database storing fault codes with respect to actions recommended is updated. For machines without automatic resets originally installed, machines may be retrofitted with automatic resets. A specified period of time may be provided in which to automatically restart a machine based upon specifications of the machine and/or the above-described analysis A provision may also be specified to automatically call for maintenance assistance if a certain number of consecutive attempts to automatically reset the machine did not succeed within a given time period. Otherwise, an infinite loop could result. In the event that automatic reset causes failure, controllers on all other similar equipment may be programmed to cease to perform automatic resets when that fault code occurs, even if the statistical analysis suggests otherwise.

For many common faults that have been substantially analyzed for certainty as described herein, equipment is programmed to automatically reset itself after a specified timeout period. In addition to reducing demand for reactive maintenance labor, such automatic resets, once implemented, greatly reduce the duration of downtime events and thus increase throughput. Downtime is reduced since there is no need for a maintenance person to a) notice the problem b) walk over to the equipment, c) evaluate the situation and d) physically perform the reset.

While the above-described technology is with reference to computerized analysis, and implementation, either partially or fully manually performed analysis and implementation are also within the scope of this discussion.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for determining whether to provide automatic reset instructions to a machine with reset capability in response to a fault code event, the method comprising:
   collecting downtime event data comprising an identification of the machine, a fault code associated therewith, downtime duration, and a fault associated with the fault code that the machine experienced within a time period;
   statistically analyzing the downtime event data; and
   determining whether executing an automatic reset on the machine probabilistically rectifies the fault for each fault code based upon the statistical analysis of the downtime event data.

2. The method as recited in claim 1, wherein the downtime event data further comprise the manner in which the fault was rectified during the time period.

3. The method as recited in claim 1 or claim 2, further comprising:
   storing the downtime event data in a datastore for access by a processor associated with the machine; and
   providing automatic reset instructions to the machine in the event that a generated fault code is one where probabilistically the fault associated with the generated fault code will be rectified by executing the automatic reset on the machine.

4. The method as recited in claim 3, further comprising:
   providing a message to maintenance personnel in the event that the generated fault code is not one where probabilistically the fault associated with the generated fault code will be rectified by executing the automatic reset on the machine.

5. A method as recited in claim 1 wherein the statistical analysis treats a number of automatic resets in a sequence of downtime events as normally distributed random variables.

6. A method for determining whether to provide automatic reset instructions to a machine with reset capability with respect to a fault code event, the method comprising:
   in a database, collecting records comprising the identification of the machine, a fault code associated therewith and the duration of a fault associated with the fault code that the machine experienced within a time period;
   performing a statistical analysis on the records to analyze whether executing an automatic reset on the machine with respect to the fault code will probabilistically rectify the fault and to generate resultant data;
   storing the resultant data in a datastore for access by a processor associated with the machine in the event that the machine experiences a fault;
   providing automatic reset instructions to the machine in the event that a generated fault code having an associated fault is one where probabilistically the associated fault will be rectified by an automatic reset; and,
   illuminating a light atop the machine in the event that the generated fault code is not one where probabilistically the associated fault will be rectified by an automatic reset.

7. A method for determining whether to provide automatic reset instructions to a machine with reset capability with respect to a fault code event, the method comprising:
   in a database, collecting records comprising the identification of the machine, a fault code associated therewith and the duration of a fault associated with the fault code that the machine experienced within a time period; and performing a statistical analysis on the records to analyze whether executing an automatic reset on the machine with respect to the fault code will probabilistically rectify the fault and to generate resultant data;

wherein the statistical analysis treats a downtime event result as a Bernoulli trial.

8. A method for correlating machine fault codes and machine automatic reset instructions, comprising:

recording pertinent information relating to a machine with reset capability, comprising a fault code of the machine and a remedy for rectifying a fault of the machine associated with the fault code;

performing a statistical analysis on the pertinent information to determine whether the fault code is a candidate for an automatic reset action; and generating output of correlated machine fault code and machine automatic reset instructions for use by an automatic reset instruction processor operatively connected to the machine.

9. A method as recited in claim 8 further comprising:

in the event the machine generates a fault code, communication with the automatic reset instruction processor to send an automatic reset instruction to the machine.

10. A method as recited in claim 9 wherein the automatic reset instruction processor is in a location remote to a machine.

11. A method as recited in claim 9 wherein the automatic reset instruction processor operates with respect to a single station.

12. A method as recited in claim 9 wherein the automatic reset instruction processor operates with respect to an individual machine.

13. A method as recited in claim 8 further comprising:

sending a message to maintenance personnel in the event that an automatic reset instruction was not sent to the machine.

14. A system for providing automatic reset instructions to a machine with reset capability in the event that the machine generates a fault code, the system comprising:

a processor in communication with a automatic reset data store that contains the result of analysis performed upon information relating to the machine, the fault code and the time taken for rectifying a fault associated with the fault code;

a network system for allowing the machine to automatically access the automatic reset data store by sending a fault code and in turn receiving instructions from the processor associated with the automatic reset data store to engage the machine's automatic reset capability; and illuminating a light atop the machine in the event that the machine's automatic reset capability is not engaged.

15. A system as recited in claim 14 wherein the information further relates to a manner in which the fault was rectified.

16. A system as recited in claim 15 wherein the analysis comprises a probability analysis.

17. A system as recited in claim 15 wherein the analysis comprises a confidence level analysis.

18. A system as recited in claim 15 wherein the analysis comprises a risk analysis.

* * * * *